United States Patent
Park et al.

(10) Patent No.: US 8,276,613 B2
(45) Date of Patent: Oct. 2, 2012

(54) ONE-WAY VALVE OF VARIABLE CAPACITY COMPRESSOR FOR VEHICLE

(75) Inventors: Jang Sik Park, Anseong-si (KR); Ki Yeon Kim, Anseong-si (KR); Jin Sang Kim, Anseong-si (KR)

(73) Assignee: Dong-Il Machinery Co., Ltd., Anseong-Si, Gyeonggi-Do (KR)

( * ) Notice: Subject to any disclaimer, the term of this patent is extended or adjusted under 35 U.S.C. 154(b) by 204 days.

(21) Appl. No.: 12/784,108

(22) Filed: May 20, 2010

(65) Prior Publication Data

US 2010/0294972 A1 Nov. 25, 2010

(30) Foreign Application Priority Data

May 21, 2009 (KR) .......................... 10-2009-0044453

(51) Int. Cl.
*F16K 17/04* (2006.01)
(52) U.S. Cl. ................ 137/535; 137/516.25; 137/543.19
(58) Field of Classification Search .................. 137/528, 137/538, 540, 543.19, 535, 516.25; 251/337
See application file for complete search history.

(56) References Cited

U.S. PATENT DOCUMENTS 1,150,743 A * 8/1915 Butts ........................ 137/516.29

FOREIGN PATENT DOCUMENTS

| JP | 2000-345967 | 12/2000 |
| JP | 2009-103336 | 5/2009 |

* cited by examiner

*Primary Examiner* — Kevin Lee
*Assistant Examiner* — Macade Brown
(74) *Attorney, Agent, or Firm* — F. Chau & Associates, LLC

(57) ABSTRACT

Disclosed is a one-way valve of a variable capacity compressor for vehicle including: a valve sheet having a coolant inlet formed at the center; a valve case provided over the valve sheet and having a plurality of coolant discharging ports along the circumferential surface; a spool valve selectively opening/closing the coolant inlet and the coolant discharging port in the valve case; and a resilient member provided between the valve case and the spool valve, wherein the plurality of coolant discharging ports are spaced from each other by a predetermined distance and one of the plurality of coolant discharging ports is closed so that the spool valve is brought in tight contact with an inner wall surface of the valve case when the coolant discharging ports are initially opened not to be swayed left and right.

8 Claims, 16 Drawing Sheets

<Prior Art>

<Prior Art>

<Prior Art>

<Prior Art>

<Prior Art>

<Prior Art>

<Prior Art>

ONE-WAY VALVE OF VARIABLE CAPACITY COMPRESSOR FOR VEHICLE

CROSS-REFERENCE TO RELATED APPLICATION

This application claims priority under 35 U.S.C. §119 to Korean Patent Application No. 10-2009-0044453, filed on May 21, 2009, in the Korean Intellectual Property Office, the disclosure of which is incorporated herein in its entirety by reference.

BACKGROUND

1. Field

The present invention is directed to a one-way valve of a variable capacity compressor for vehicle, and more particularly to a one-way valve of a variable capacity compressor for vehicle that may reduce noises created between a valve case and a spool valve.

2. Related Art

In general, a compressor for vehicular air conditioner compresses a coolant gas supplied from an evaporator using a dynamic force and transfers the compressed coolant gas to a condenser. Among the compressors, variable capacity compressors recently gain popularity, which control the inclined angle of a swash plate to change the discharging volume.

As shown in FIG. 1, a variable capacity swash plate-type compressor 100 generally includes a cylinder block 110 that includes a plurality of cylinder bores 112, a suction port 114, and a suction muffler chamber 116; a front housing that is coupled with the cylinder block 110 before the cylinder block 110 to form a crank chamber 122; and a rear housing 130 that is located behind the cylinder block 110 and includes a suction chamber 132, a discharging chamber 134, and a discharging path 136.

A valve plate 140 is provided between the front housing 120 and the rear housing 130 and a coolant is introduced and discharged through the valve plate 140. As shown in FIGS. 1 and 2, the valve plate 140 is shaped as a circular plate and includes a plurality of coolant suction openings 140a that are arranged along an outer circular arc and a plurality of coolant discharging openings 140b that are arranged along an inner circular arc. A suction reed valve 142 is positioned in front of the valve plate 140 and a discharging reed valve 144 and a retainer 146 are sequentially positioned behind the valve plate 140. A one-way valve 150 is provided to prevent a coolant from flowing back to the front of the valve plate 140.

The variable capacity swash plate-type compressor 100 further includes a driving shaft 160 rotatably provided at the central portion of the cylinder block 110 and the front housing 120; a swash plate 170 connected to a rotor 172 mounted at the driving shaft 160 through a hinge portion 174 in the crank chamber 122 so that its inclined angle varies with the pressure of the crank chamber 122; and a plurality of pistons 180, each interlocking with the swash plate 170 through a shoe 176 and travelling forth and back in the cylinder bore 112 according to the rotation of the swash plate 170, thus sucking and compressing the coolant. A compression coil spring 178 is provided between the swash plate 170 and the rotor 172 to return the swash plate 170 to the original position.

As the driving shaft 160 and the swash plate 170 are rotated together, the coolant compressed in the cylinder block 110 is discharged to a condenser through the discharging path 136 and the discharged volume of the coolant may be varied by adjusting the inclined angle of the swash plate 170.

Although the swash plate 170 maintains the minimum inclined angle when the air conditioner of the vehicle is turned off, the angle does not become zero degree and thus the coolant is partially discharged from the variable capacity compressor 100 to the condenser even when the air conditioner is turned off. To prevent the coolant from being discharged when the air conditioner is turned off and prevent the discharged coolant from flowing back from the condenser to the variable capacity compressor 100, the one-way valve 150 is provided at the end of the valve plate 140.

The conventional one-way valve 150, as shown in FIGS. 2 and 3A, includes a valve sheet 152 having a coolant inlet 152a formed at the center; a valve case 154 provided over the valve sheet 152 and having a plurality of coolant discharging ports 154a along the circumferential surface; a spool valve 156 selectively opening/closing the coolant inlet 152a and the coolant discharging port 154a in the valve case 154; and a resilient member 158 provided between the valve case 154 and the spool valve 156.

As shown in FIGS. 3A and 3B, the valve case 154 includes four coolant discharging ports 154a, one facing another with respect to the central vertical axis of the valve case 154, and a vent hole 154b at the center of the top surface of the valve case 154 to prevent occurrence of back pressure. The valve case 154 further includes a guide portion 154c that extends downward from the inner surface of the top portion to guide and support the resilient member 158.

The spool valve 156 is shaped as a cylindrical structure whose bottom surface is closed and receives the resilient member 158 therein. The spool valve 156 is lifted up and down by pressure of the coolant in the valve case 154 to selectively open and close the coolant inlet 152a and the coolant discharging port 154a.

In the conventional one-way valve 150, however, initial opening pressure was unstable due to a delay in opening time and leakage of coolant between the valve case 154 and the spool valve 156 when the spool valve 156 rises to initially open the coolant discharging port 154a, thus causing noises in pipes.

In the conventional one-way valve 150, immediately before the coolant discharging port 154a is initially opened, that is, when the pressure P of the coolant is equal to the spring force F of the resilient member, the spool valve 156 was swayed left and right due to back pressure of the coolant, thus creating a valve noise (low-frequency noise).

Also, the conventional one-way valve 150 has a structure in which back pressure exerted by the coolant discharging port 154 right after the coolant discharging port 154a is initially opened is difficult to release through the vent hole 164a provided at the center of the top portion. Furthermore, in the conventional one-way valve 150, a vortex flow generated while back pressure is released through the vent hole 154a caused a valve noise (high-frequency noise).

Accordingly, there is a need for a one-way valve of a variable capacity compressor for vehicle that may stabilize initial opening pressure of the valve to reduce noises created in pipes.

Further, there is a need for a one-way valve of a variable capacity compressor for vehicle that may reduce not only low-frequency noises but also high-frequency noises created in the valve when a spool valve initially opens coolant discharging ports.

SUMMARY

In accordance with an exemplary embodiment of the present invention, there is provided a one-way valve of a variable capacity compressor for vehicle including: a valve sheet having a coolant inlet formed at the center; a valve case provided over the valve sheet and having a plurality of coolant discharging ports along the circumferential surface; a spool valve selectively opening/closing the coolant inlet and the coolant discharging port in the valve case; and a resilient member provided between the valve case and the spool valve, wherein the plurality of coolant discharging ports are spaced from each other by a predetermined distance and one of the plurality of coolant discharging ports is closed so that the spool valve is brought in tight contact with an inner wall surface of the valve case when the coolant discharging ports are initially opened not to be swayed left and right.

Each of the plurality of coolant discharging ports may be shaped as a triangle, a trapezoid, or a quadrangle whose top side is shorter than the bottom side.

The spool valve may further include a strip portion that is formed along a lower circumferential surface and inclined at a predetermined angle.

The strip portion of the spool valve may be formed to be adjacent to the lower end of the coolant discharging port when the spool valve is at its initial position.

The valve case may include a first vent hole formed at the center of the top surface and a plurality of second vent holes formed around the first vent hole.

The diameter of each second vent hole may be relatively larger than that of the first vent hole.

The resilient member may have a spring constant of about 26 gf/mm to about 40 gf/mm.

In the one-way valve of a variable capacity compressor for vehicle according to exemplary embodiments of the present invention, when a coolant is introduced through the coolant inlet of the valve sheet so that the pressure of the coolant becomes identical to the spring force of the resilient member, the spool valve is brought in tight contact with the coolant inlet of the valve case and accordingly not swayed left and right despite the back pressure of the coolant. Thus, the occurrence of low-frequency noises may be significantly reduced in the valve.

Further, since back pressure generated at the coolant discharging ports immediately after the coolant discharging ports are initially opened is sequentially released through the second vent holes and the first vent hole of the valve case, it may be possible to prevent a vortex flow from occurring between the valve case and the spool valve, thus reducing high-frequency noises created in the valve.

Since the one-way valve of a variable capacity compressor for vehicle according to an exemplary embodiment of the present invention further includes the strip portion in the spool valve and the spring constant of the resilient member is adapted to be reduced, pressure may be stably maintained in the valve when the valve is opened and closed by the resilient member. Thus, it may be possible to reduce noises created in the valve.

BRIEF DESCRIPTION OF THE DRAWINGS

The implementation of this document will be described in detail with reference to the following drawings in which like numerals refer to like elements.

DETAILED DESCRIPTION

Hereinafter, exemplary embodiments of the present invention will be described in greater detail with reference to accompanying drawings.

<First Exemplary Embodiment>

Figure 4A:
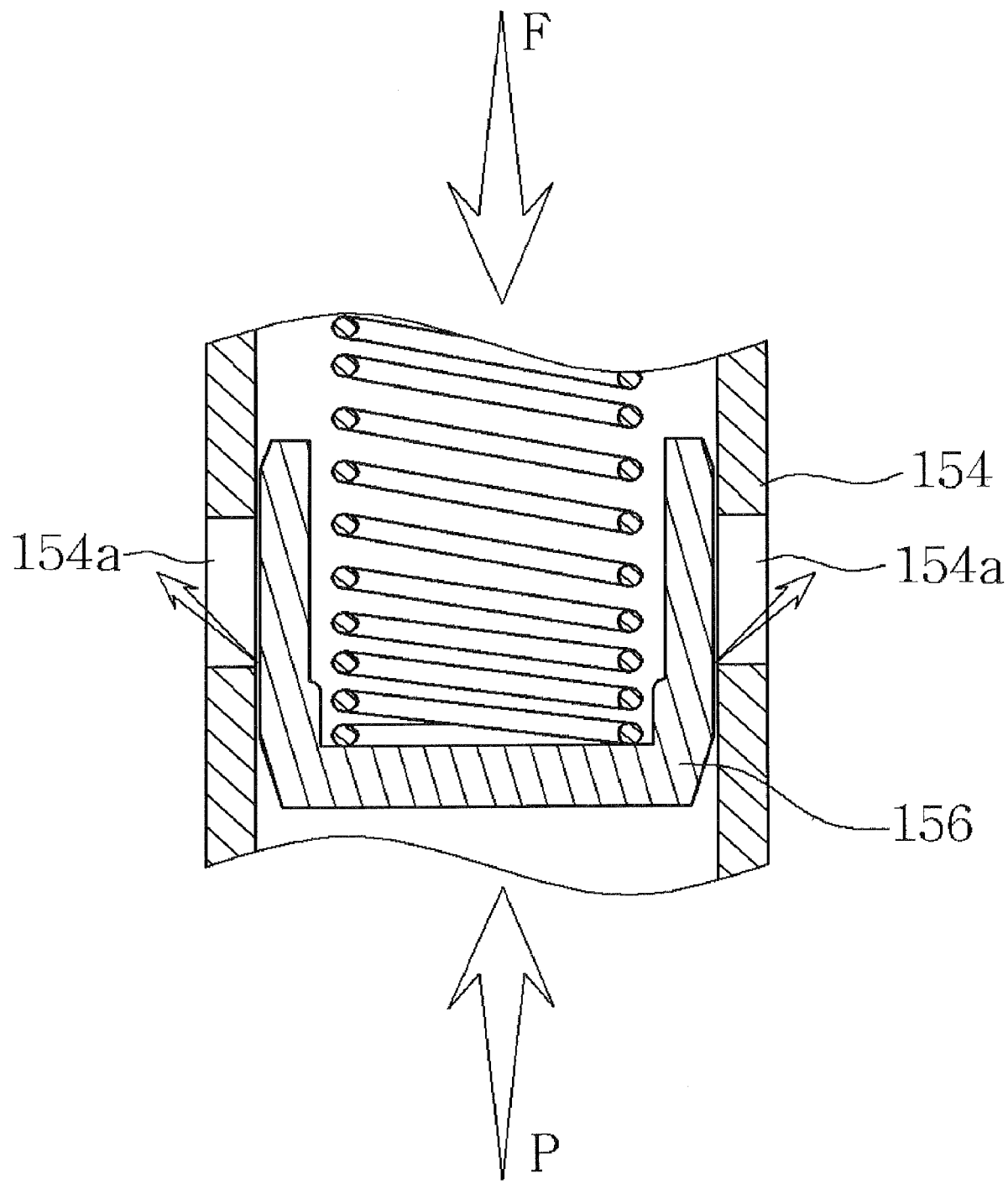
FIGS. 4A to 4C are views illustrating the operation of a spool valve included in a conventional one-way valve.
Figure 4B:
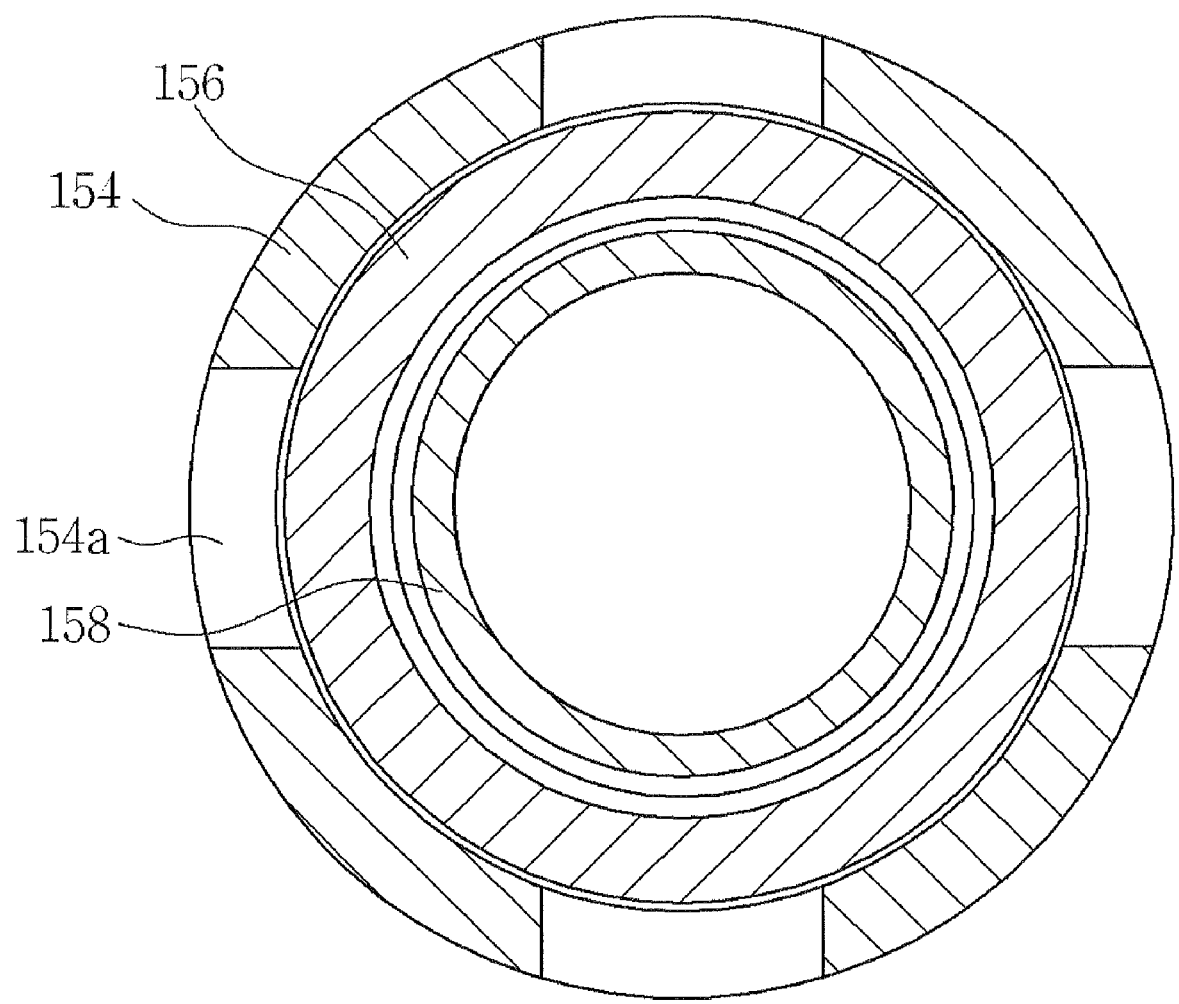
Figure 4C:
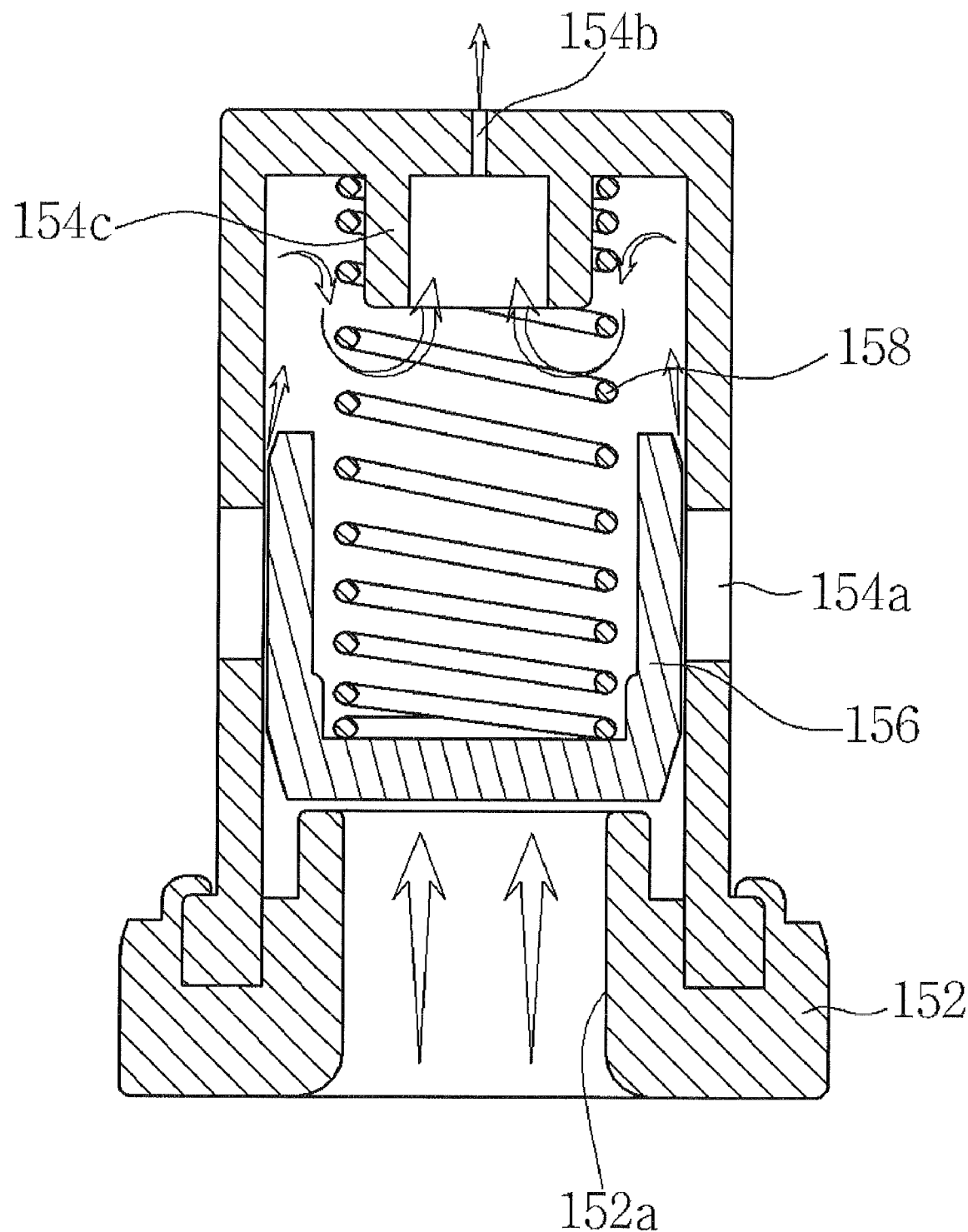
Figure 5:
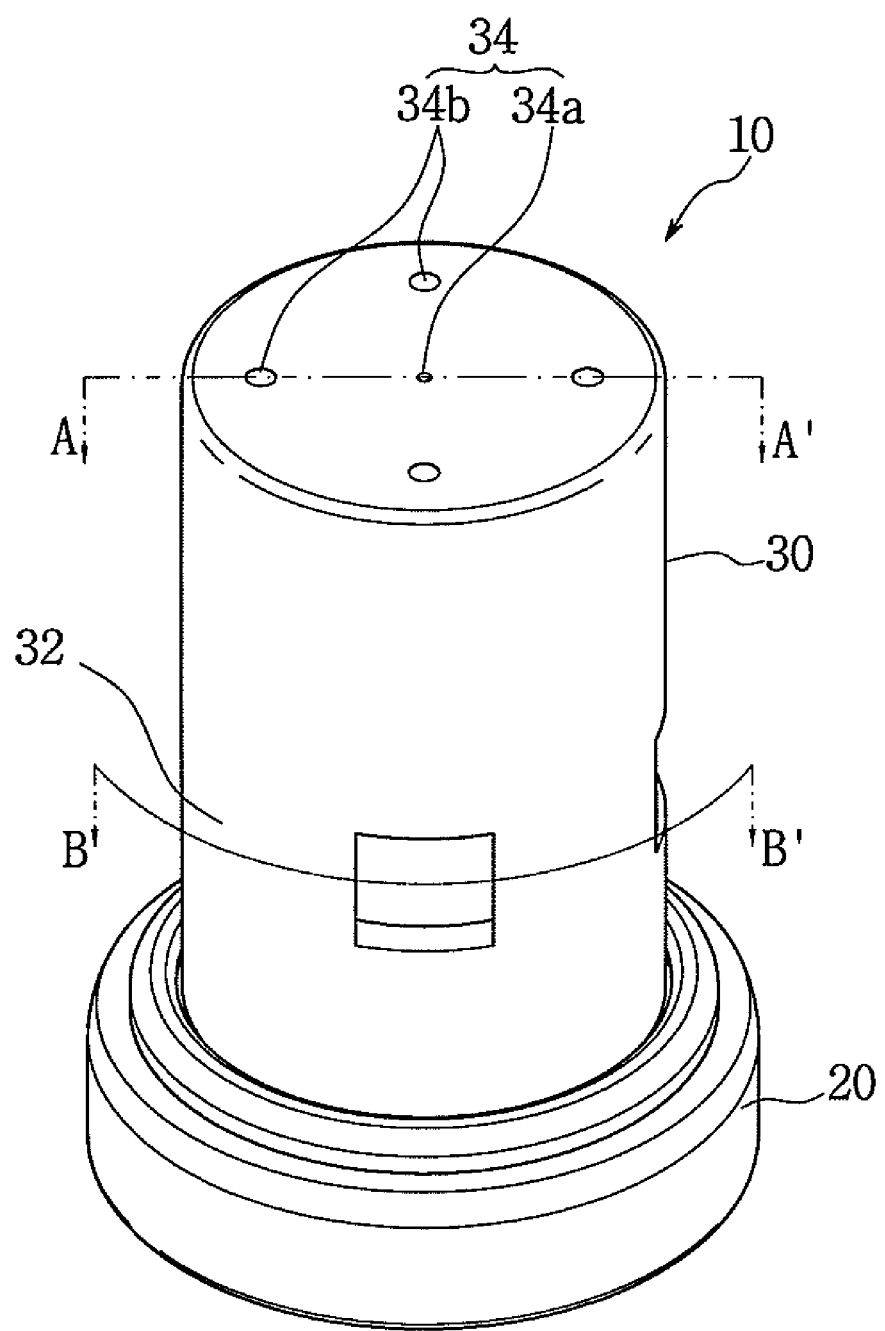
FIG. 5 is a perspective view illustrating a one-way valve of a variable capacity compressor according to a first exemplary embodiment of the present invention.
Figure 6A:
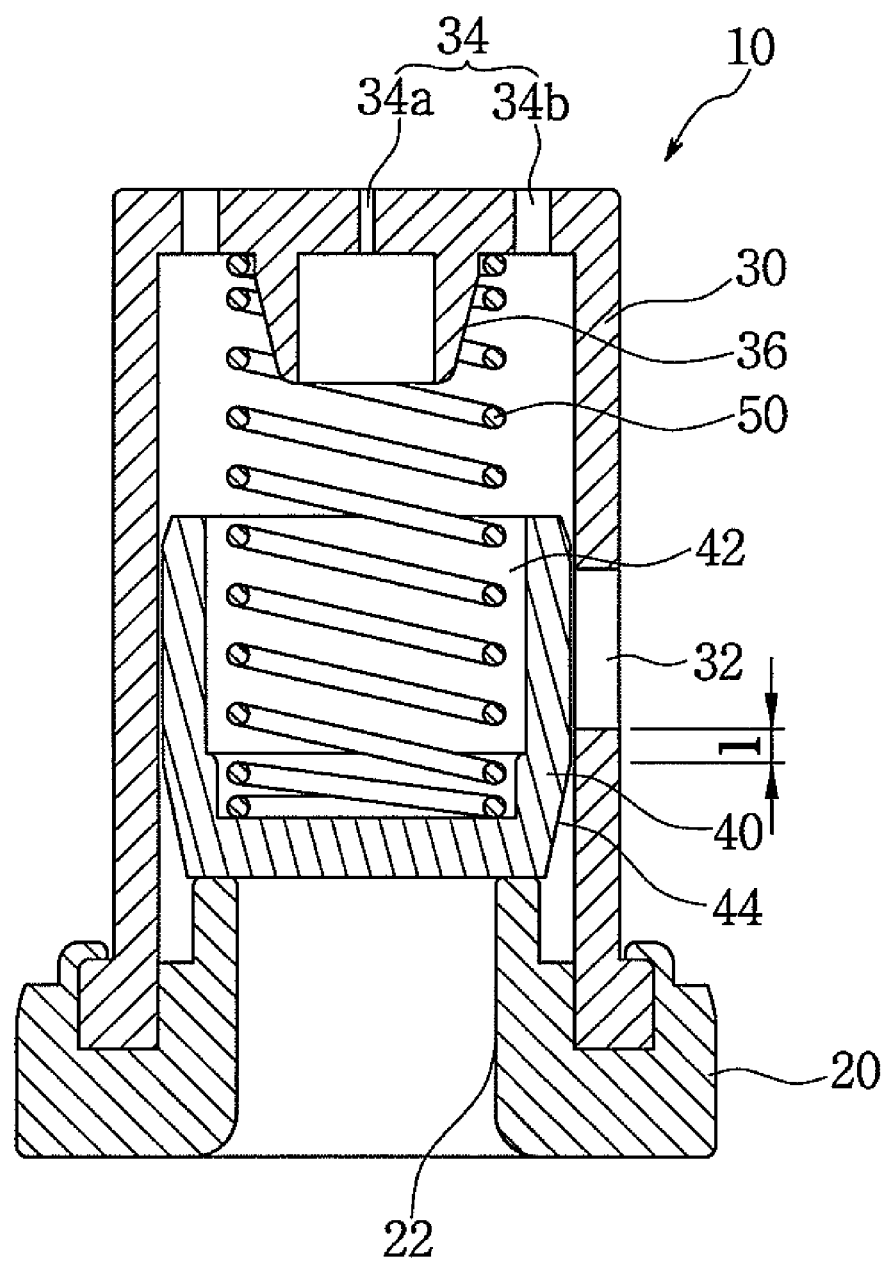
FIGS. 6A and 6B are cross section views taken along lines A-A' and B-B', respectively, of FIG. 5.
Figure 6B:
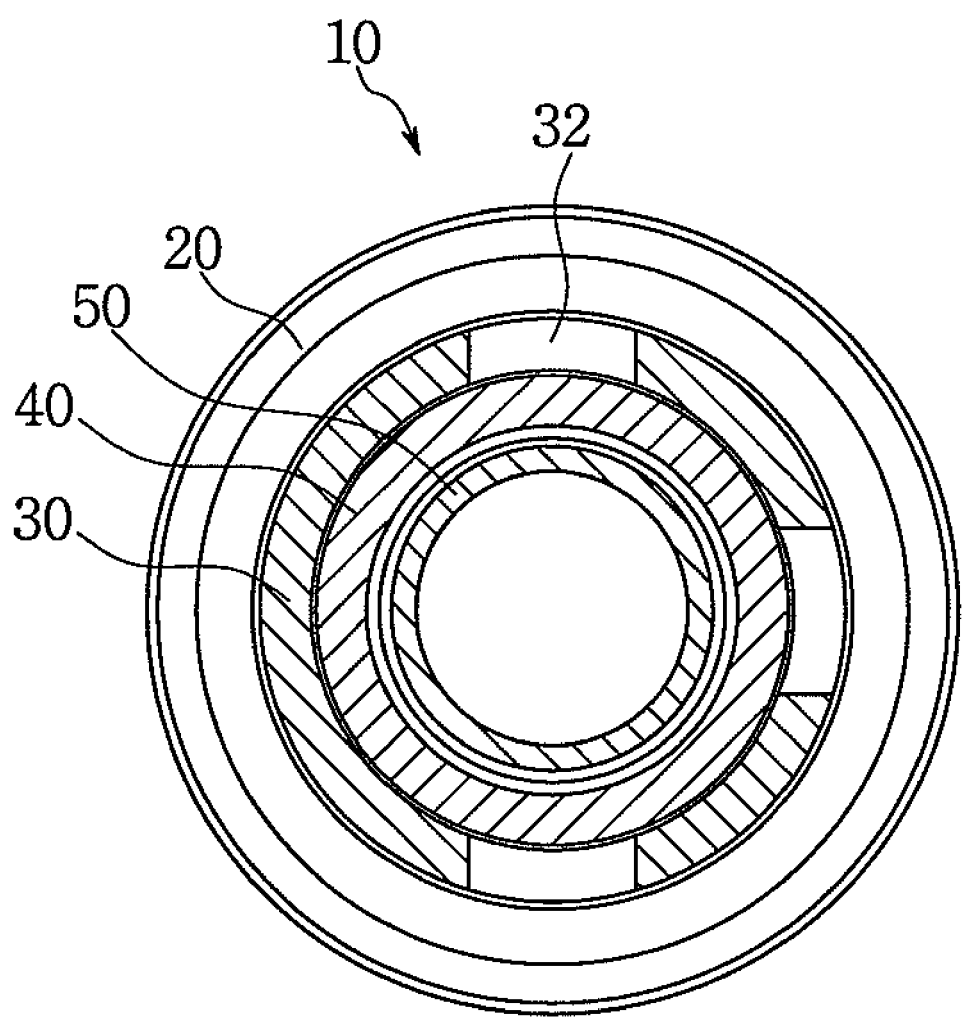

FIG. 5 is a perspective view illustrating a one-way valve according to a first exemplary embodiment of the present invention and FIGS. 6A and 6B are cross section views taken along lines A-A' and B-B', respectively, of FIG. 4.

As shown in FIGS. 5 and 6A, the one-way valve 10 according to a first exemplary embodiment of the present invention includes a valve sheet 20 having a coolant inlet 22 formed at its center; a valve case 30 provided over the valve sheet 20 and having a plurality of coolant discharging ports 32 along the circumferential surface; a spool valve 40 selectively opening/closing the coolant inlet 22 and the coolant discharging port 32 in the valve case 30; and a resilient member 50 provided between the valve case 30 and the spool valve 40.

Figure 1:
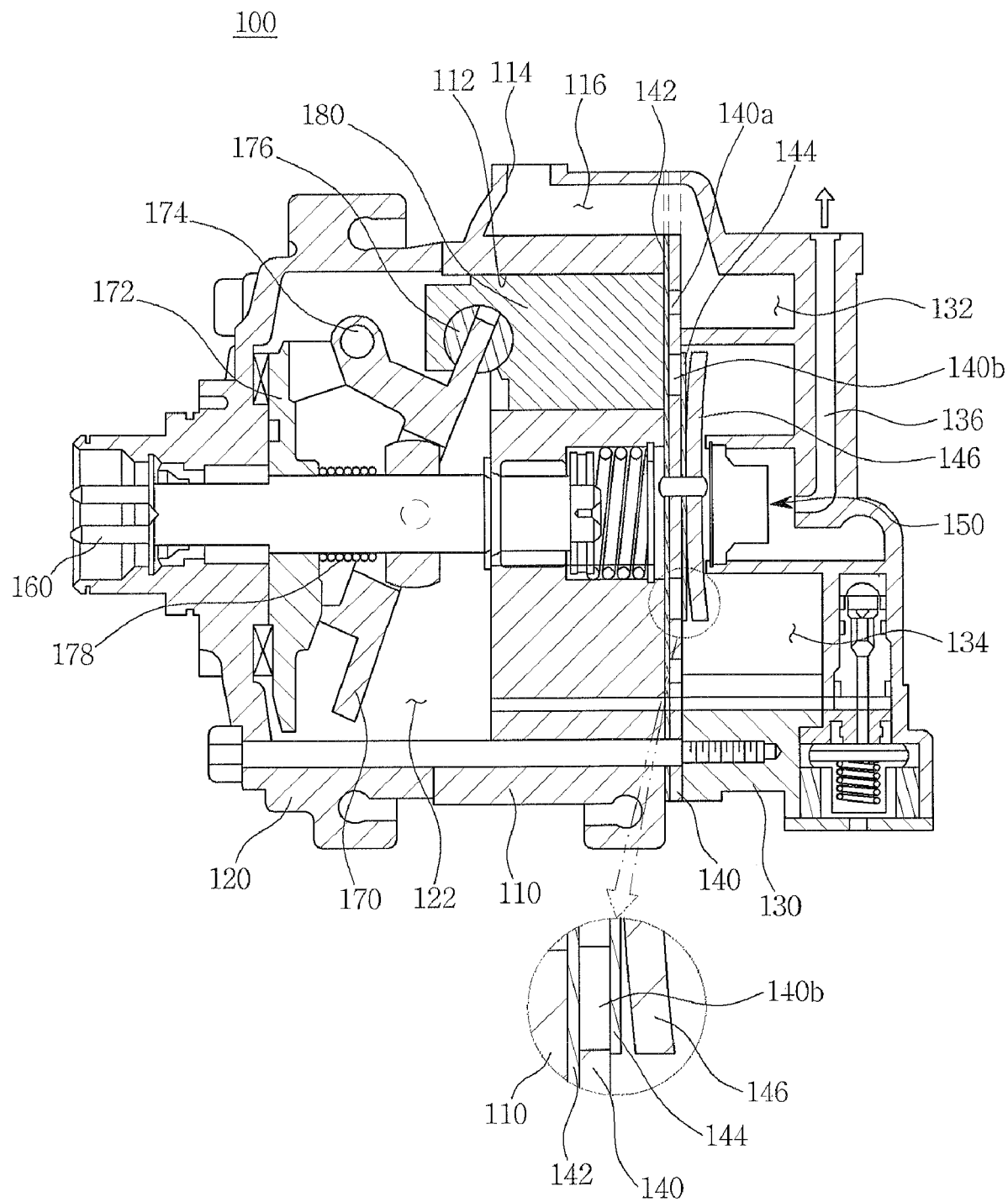
FIG. 1 is a cross section view illustrating a one-way valve of a variable capacity compressor for vehicle according to the prior art.
Figure 2:
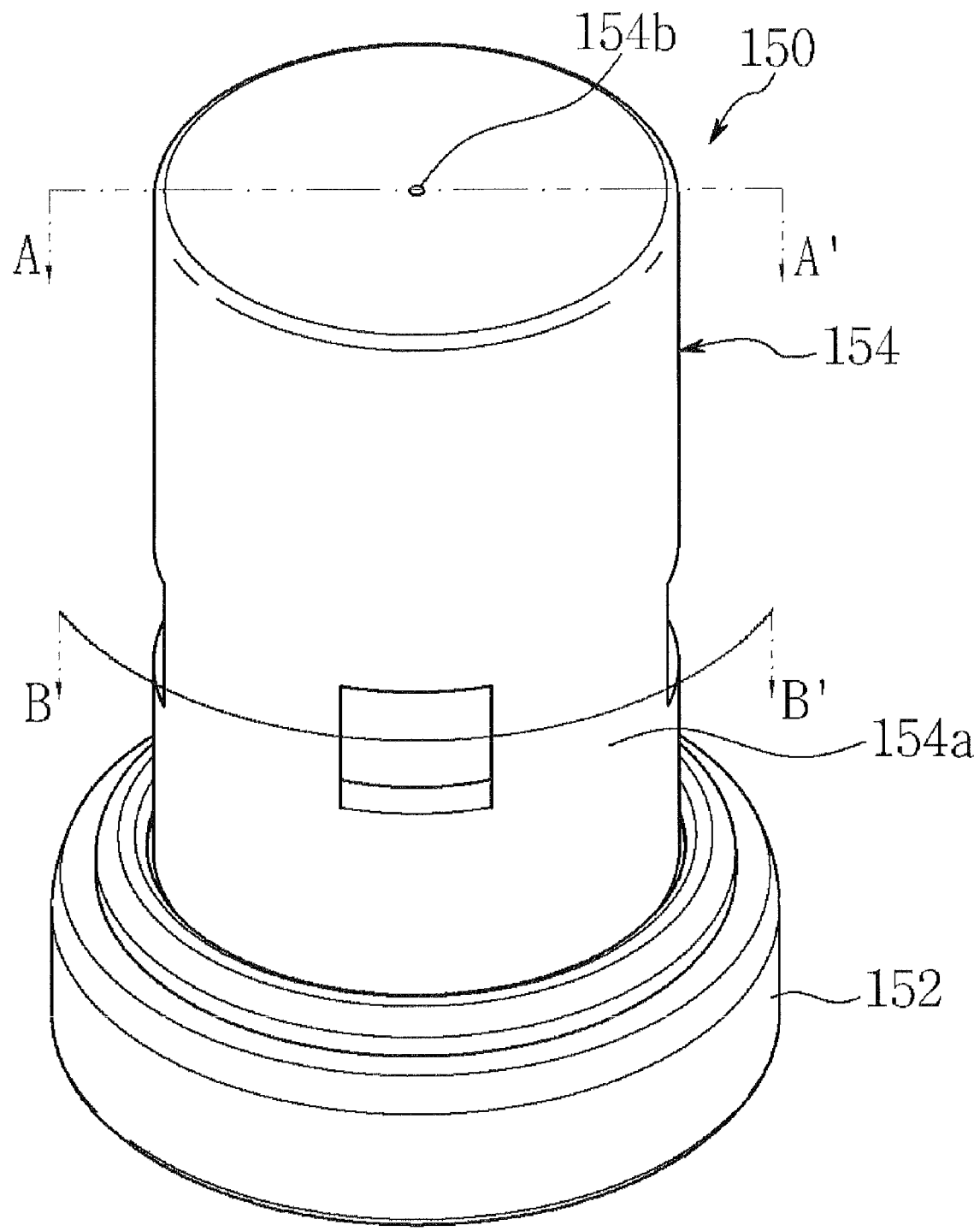
FIG. 2 is a perspective view illustrating a one-way valve of a variable capacity compressor according to the prior art.

The valve sheet 20 is provided at a discharging flow path 136 of the compressor 100 shown in FIG. 1, and includes the coolant inlet 22 therein to allow for inflow of a coolant from the compressor 100.

As shown in FIG. 6A, the valve case 30 further includes a guide portion 36 that extends downward from the inner surface of the top portion to guide and support the resilient member 50. As going downward, the diameter of the guide portion 36 is decreased.

The valve case 30 is shaped as a cylinder whose top surface is closed, and its lower end is coupled with the upper portion of the valve sheet 20.

And, as shown in FIGS. 6A and 6B, the valve case 30 includes a plurality of coolant discharging ports 32 along the circumferential surface of the valve case 30 and a first vent hole 34a formed at the center of the top surface and a plurality of second vent holes 34b formed around the first vent hole 34a.

As shown in FIGS. 5 and 6B, the plurality of coolant discharging ports 32 (in this embodiment, for example, three coolant discharging ports) are spaced from each other by a predetermined distance in a non-uniform manner along the circumferential surface of the valve case 30. For example, two of the plurality of coolant discharging ports 32 may face each other and the other may be positioned between the two facing coolant discharging ports 32. And, among the plurality of coolant discharging ports 32, one coolant discharging port is closed. That is, the three coolant discharging ports 32 are arranged along the circumferential surface of the valve case 30 to be non-uniformly spaced from each other.

Although the coolant discharging port 32 is shown to be rectangular in FIG. 5, the coolant discharging port 32 may be shaped as a triangle or a trapezoid whose top side is shorter than the bottom side.

Figure 7A:
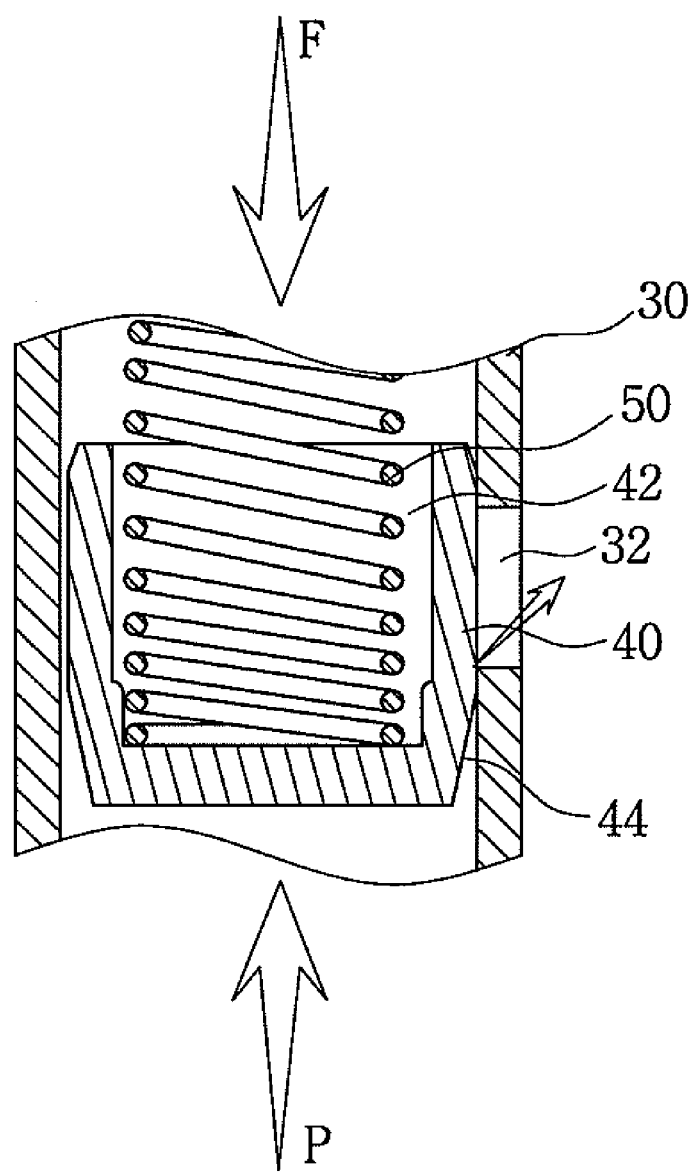
FIGS. 7A to 7C are views illustrating the operation of a spool valve included in the one-way valve according to the first exemplary embodiment of the present invention.
Figure 7B:
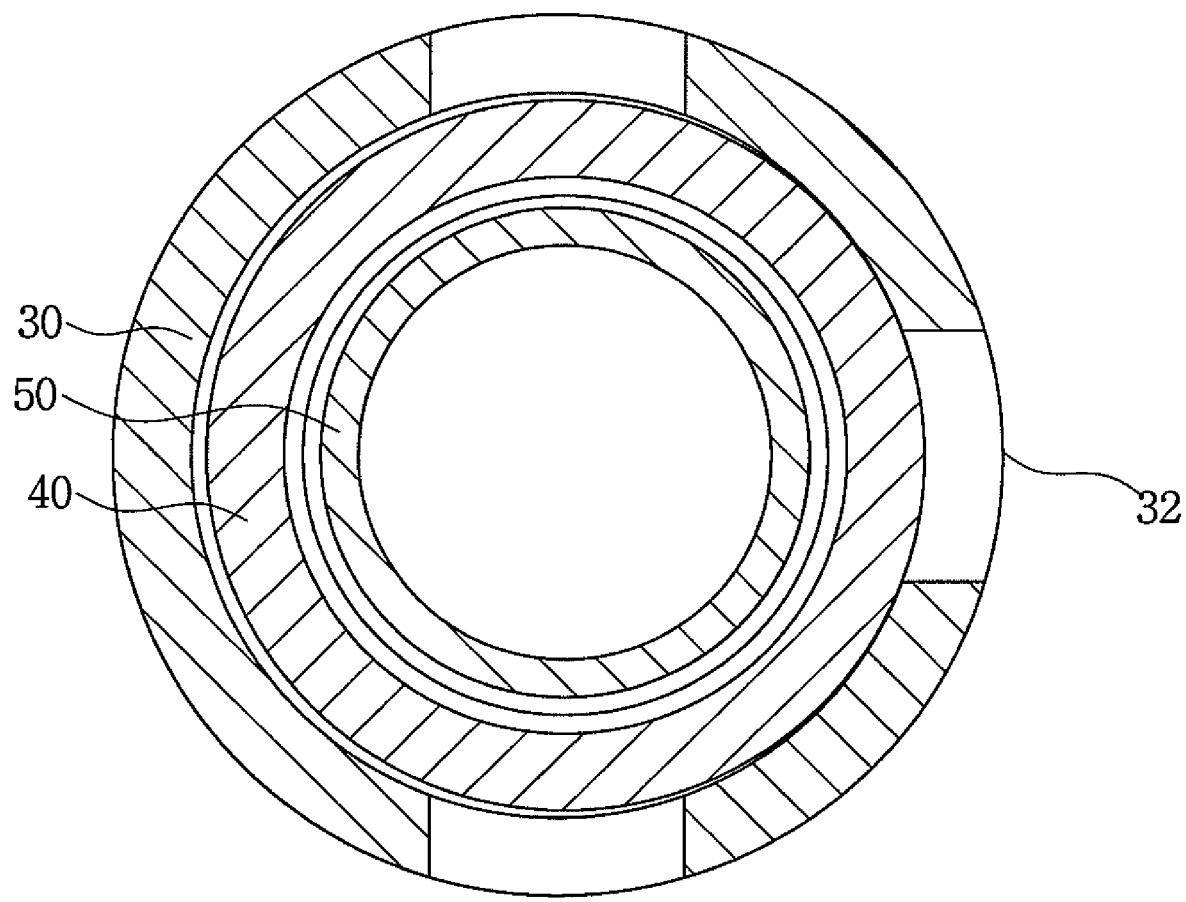

The reason why the plurality of coolant discharging ports 32 have been non-uniformly arranged on the circumferential surface of the valve case 30 is to prevent the spool valve 40 from being swayed left and right due to back pressure of the coolant immediately before the coolant discharging ports 32 are initially opened, that is, when the pressure P of the coolant is equal to the spring force F of the resilient member. As shown in FIGS. 7A and 7B, when lifted up and down, the spool valve 40 is brought in tight contact with the inner wall surface of the valve case 30 where the coolant discharging ports 32 are formed, thus being prevented from being swayed left and right.

As shown in FIGS. 5 and 6A, the first vent hole 34a is provided at the center of the top surface of the valve case 30. And, four second vent holes 34b are arranged around the first vent hole 34b and spaced from each other at a predetermined distance. The diameter of each second vent hole 34b is relatively larger than that of the first vent hole 34a. For example, the second vent hole 34b may be larger in diameter than the first vent hole 34a by about two or three times.

The first vent hole 34a and the second vent holes 34b as formed at the valve case 30 allow the back pressure generated at the coolant discharging ports 32 immediately after the coolant discharging ports 32 are initially opened to be easily released through the first vent hole 34a and the second vent holes 34b of the valve case 30. Accordingly, a vortex flow may be prevented from occurring and a consequence is a reduction in creation of high-frequency noises.

The spool valve 40 is configured so that its bottom portion is closed as shown in FIG. 6A, and the resilient member 50 is adapted to be inserted into a receiving portion 42.

Figure 3A:
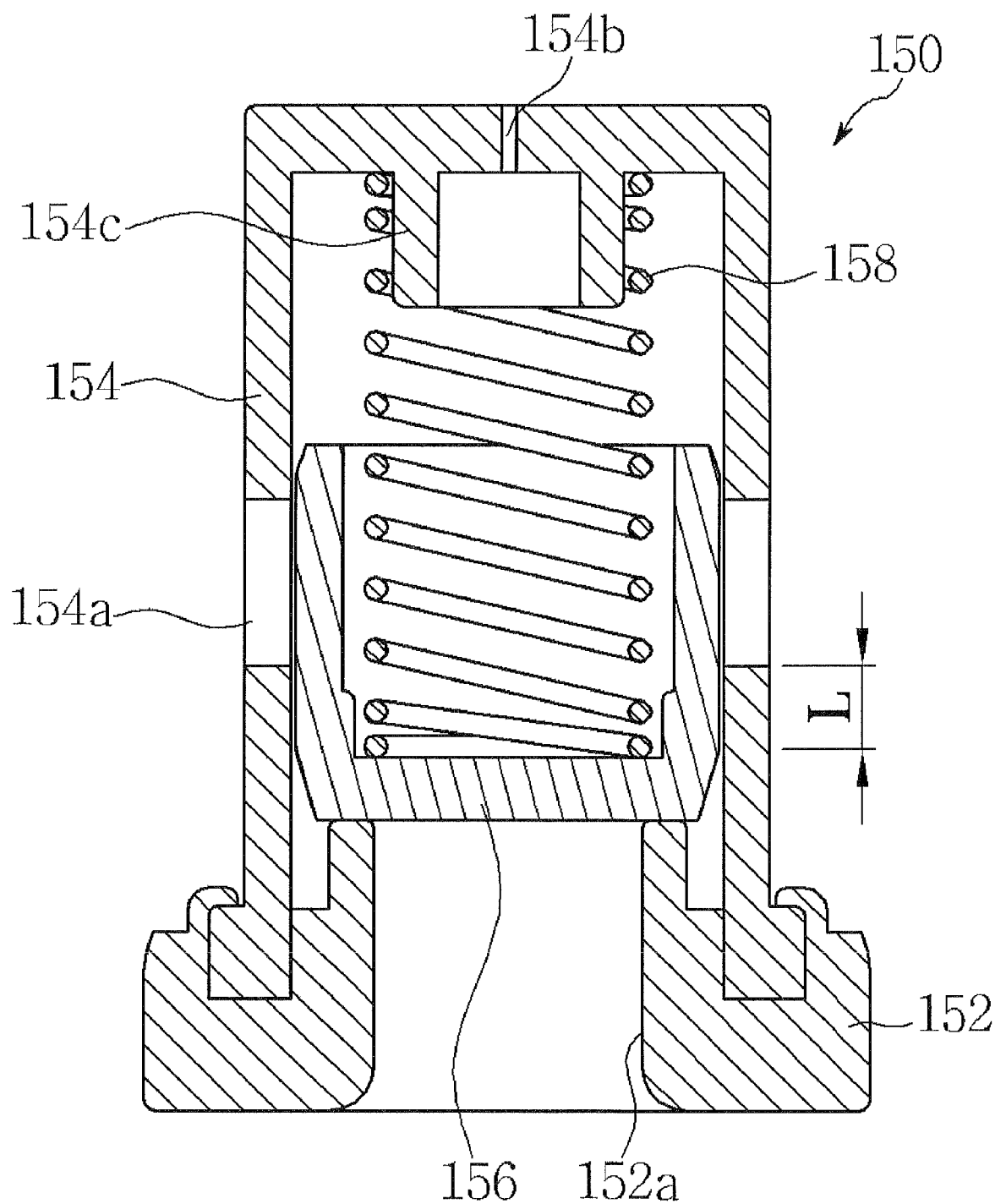
FIGS. 3A and 3B are cross section views taken along lines A-A' and B-B', respectively, of FIG. 2.
Figure 3B:
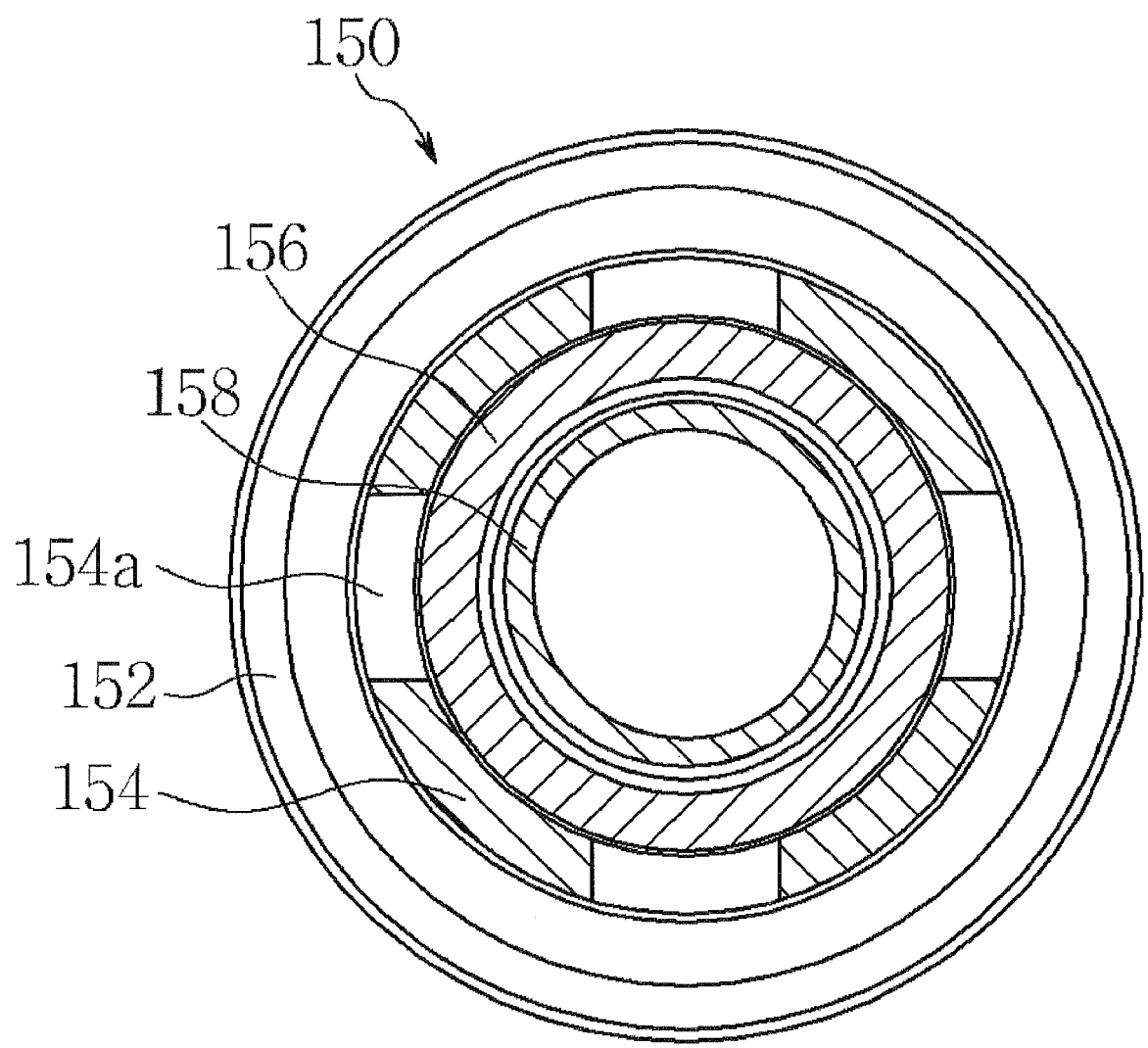

Further, the spool valve 40 includes a strip portion 44 that is formed along the lower circumferential surface and inclined at a predetermined angle. The strip portion of the spool valve may be formed to be adjacent to the lower end of the coolant discharging port when the spool valve is at its initial position. That is, the strip portion 44 serves to further reduce the distance 1 from the lower end of the coolant discharging portion 32 when the spool valve is at its initial position as shown in FIG. 6A than the distance L in the prior art as shown in FIG. 3A to stabilize initial opening pressure.

The resilient member 50 is provided between the valve case 30 and the spool valve 40 and functions to return the spool valve 40 to its original position when the pressure of the coolant is released.

The resilient member 50 may have a spring constant of about 26 gf/mm to about 40 gf/mm.

The operation of the spool valve of the one-way valve according to the first exemplary embodiment of the present invention will now be described with reference to FIGS. 7A to 7C.

Under the initial condition of the spool valve 40 as shown in FIG. 6A, a coolant is first introduced into the coolant inlet 22 of the valve sheet 20 and thus spring force F of the resilient member becomes identical to pressure P of the coolant as shown in FIGS. 7A and 7B. At the moment, the spool valve 40 is brought in tight contact with the inner wall surface of the valve case 30 where the coolant discharging port 32 is formed. Thus, the spool valve 40 is not swayed left and right irrespective of occurrence of back pressure of the coolant, thus preventing occurrence of low-frequency noises.

Figure 7C:
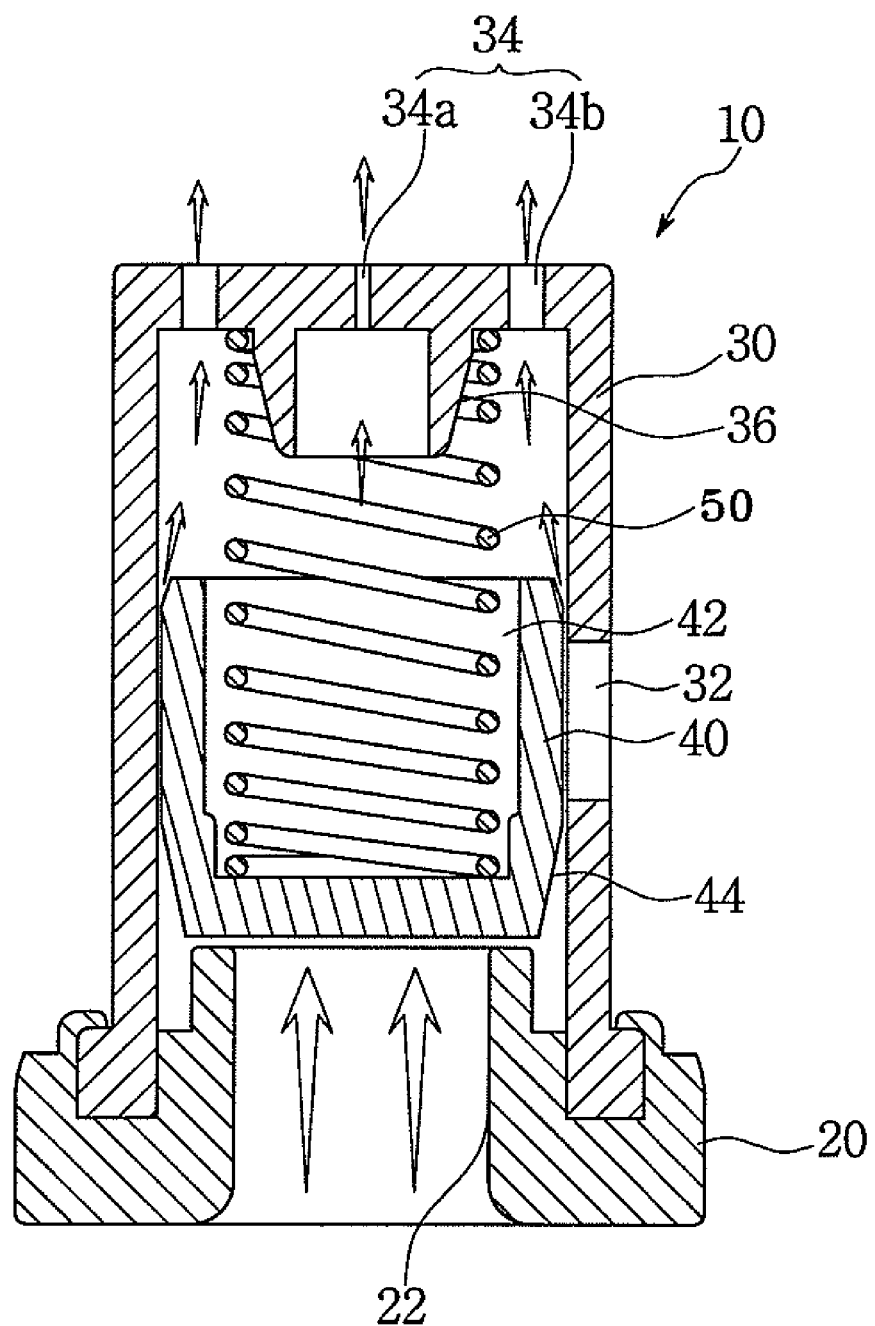

Further, right after the coolant discharging ports 32 are initially opened, back pressure created from the coolant discharging ports 32 are sequentially released through the second vent holes 34b and the first vent hole 34a of the valve case 30 as shown in FIG. 7C. Accordingly, it may be possible to prevent a vortex flow from being generated between the valve case 30 and the spool valve 40 as well as to quickly release the back pressure, thus reducing high-frequency noises created in the valve.

<Second Exemplary Embodiment>

Figure 8:
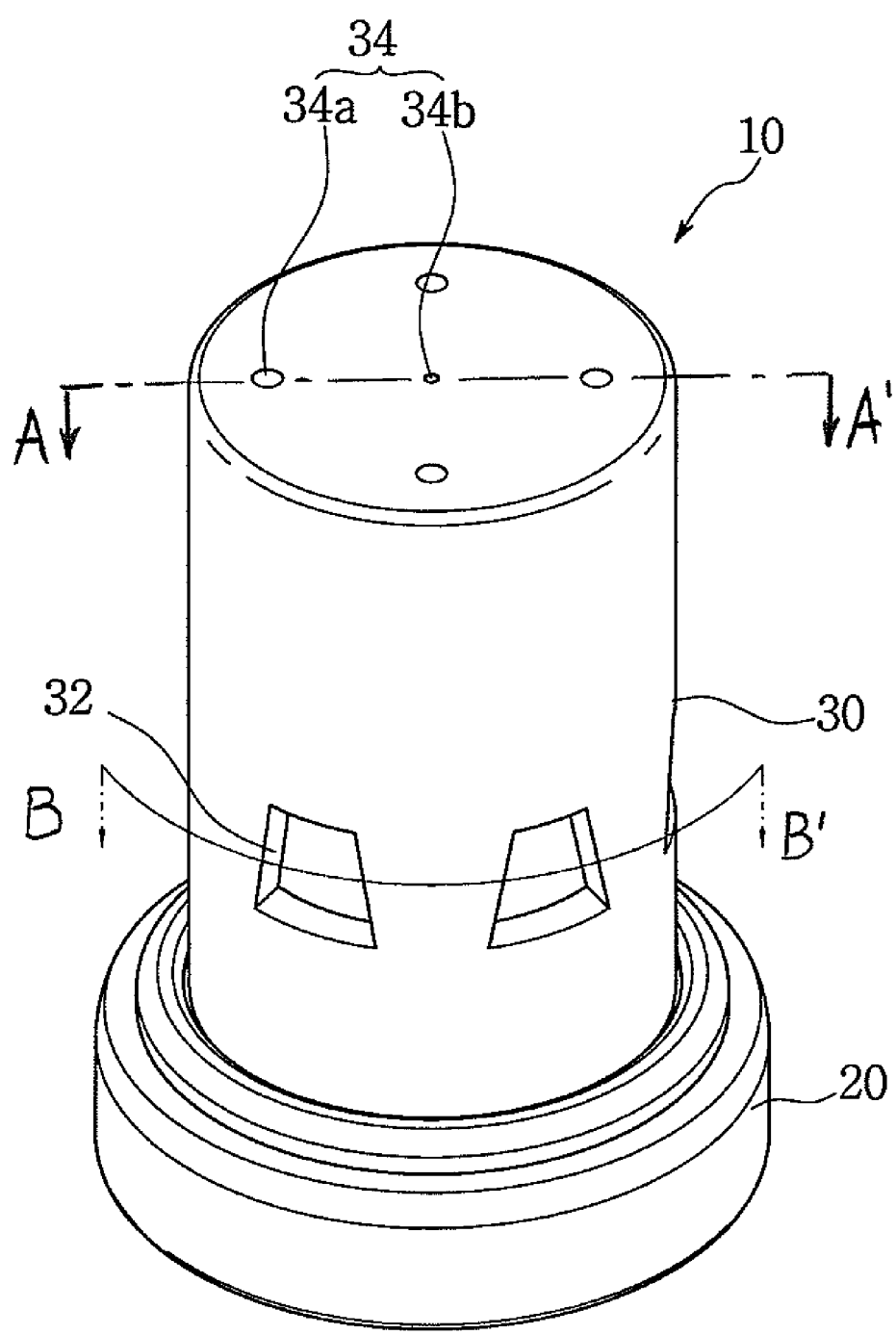
FIG. 8 is a perspective view illustrating a one-way valve of a variable capacity compressor according to a second exemplary embodiment of the present invention.
Figure 9A:
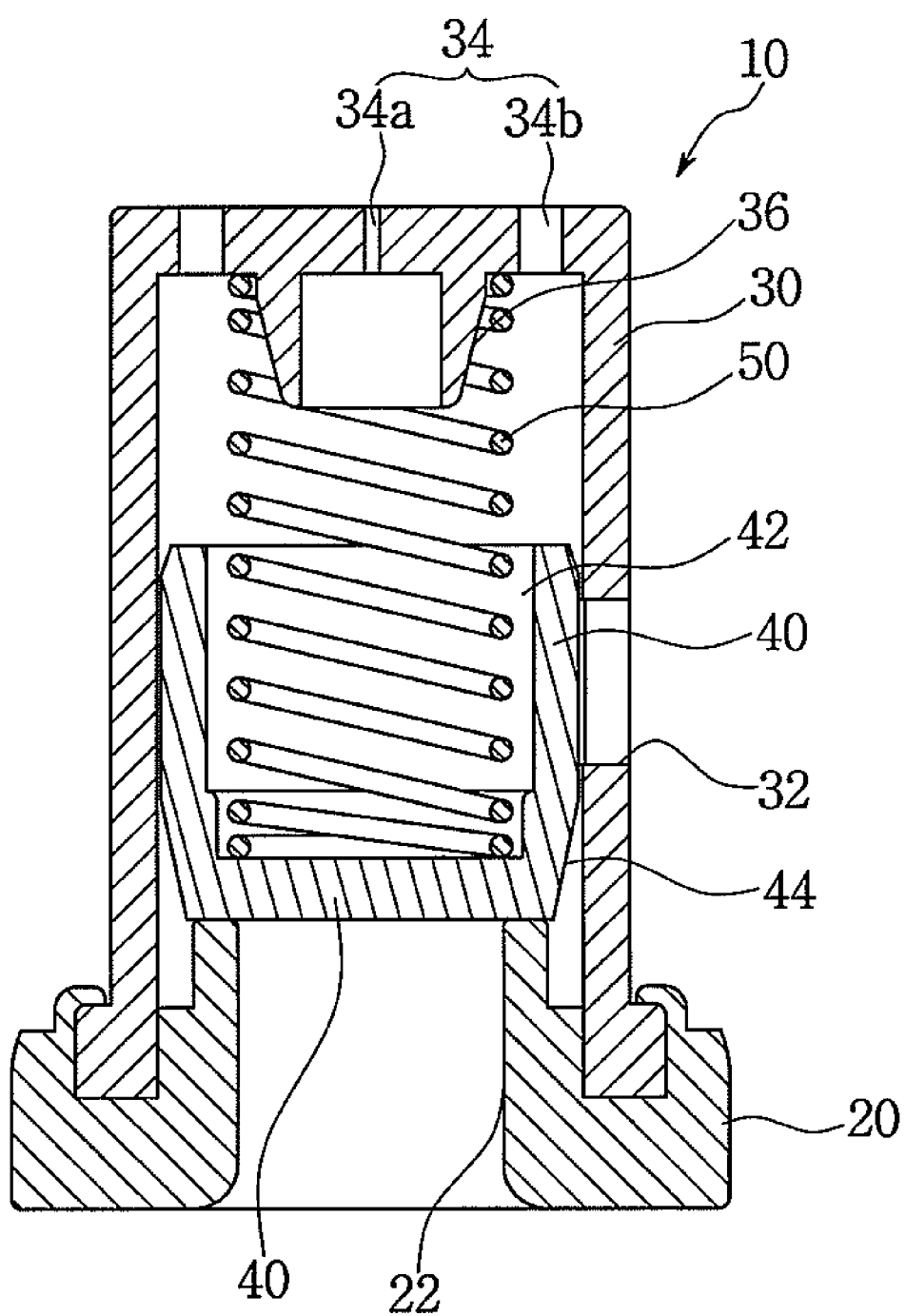
FIGS. 9A and 9B are cross section views taken along lines A-A' and B-B', respectively of FIG. 8.
Figure 9B:
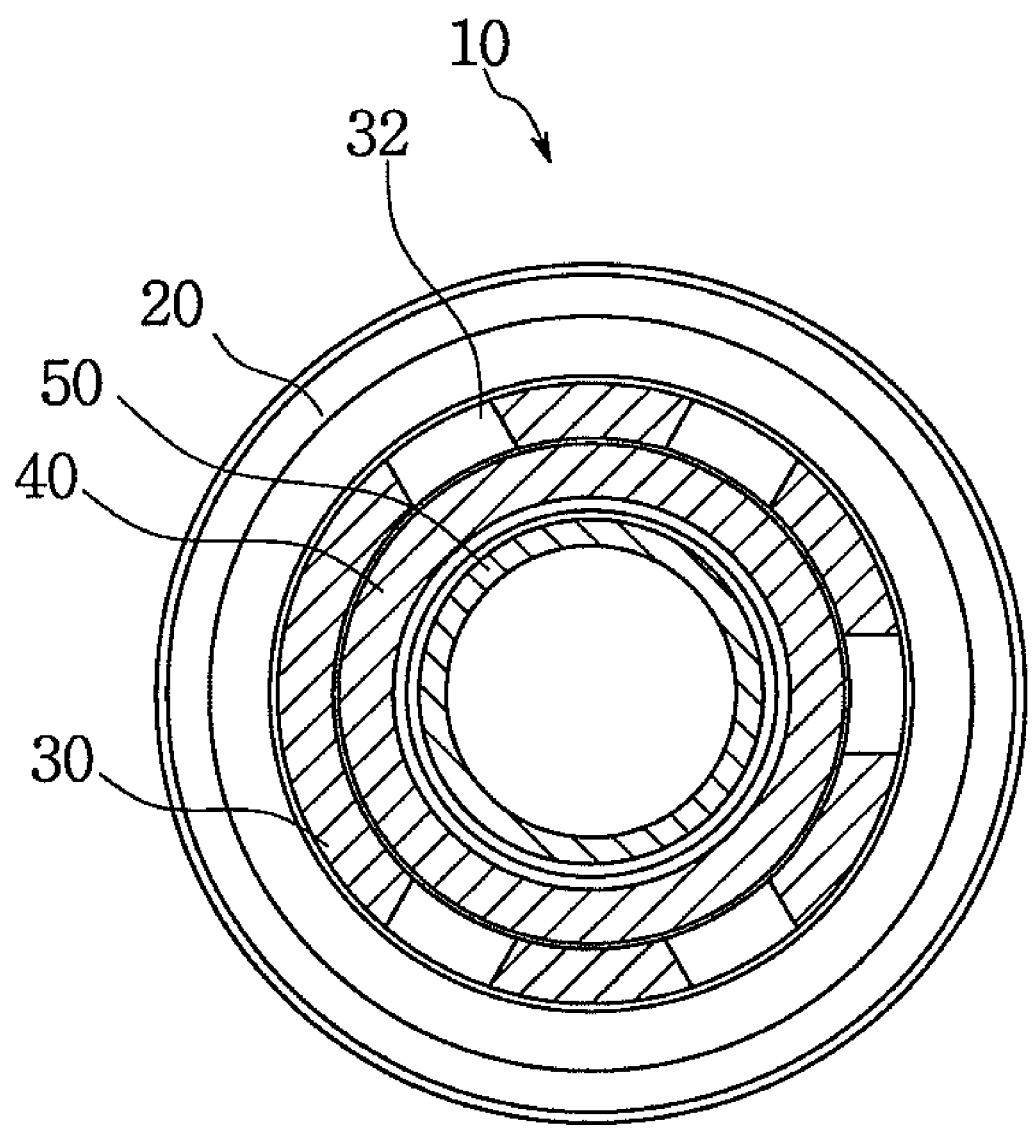

FIG. 8 is a perspective view illustrating a one-way valve of a variable capacity compressor according to a second exemplary embodiment of the present invention and FIGS. 9 and 9B are cross section views taken along lines A-A' and B-B', respectively of FIG. 8.

As shown in FIGS. 8 and 9A-9B, the one-way valve 10 according to a second exemplary embodiment of the present invention includes a valve sheet 20 having a coolant inlet 22 formed at its center; a valve case 30 provided over the valve sheet 20 and having a plurality of coolant discharging ports 32 along the circumferential surface; a spool valve 40 selectively opening/closing the coolant inlet 22 and the coolant discharging port 32 in the valve case 30; and a resilient member 50 provided between the valve case 30 and the spool valve 40.

In the second exemplary embodiment of the present invention, the valve sheet 20, the valve case 30, the spool valve 40, and the resilient member 50 are substantially identical to those in the first exemplary embodiment of the present invention except for the number and shape of the coolant discharging port and thus repetitive descriptions will be omitted.

As shown in FIG. 8, each coolant discharging port 32 formed at the valve case 30 is shaped as a trapezoid where the top side is shorter than the bottom side.

Further, as shown in FIG. 9A-9B, the plurality of coolant discharging ports (in this embodiment, for example, five coolant discharging ports) are spaced from each other by a predetermined distance in a non-uniform manner along the circumferential surface of the valve case 30. Among those coolant discharging ports, one is configured to be closed.

Although each coolant discharging port 32 is illustrative to have a trapezoidal shape, the shape is not limited, but may be shaped as a triangle or quadrangle whose top side is shorter than the bottom side.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A one-way valve of a variable capacity compressor for a vehicle comprising:
    a valve sheet having a coolant inlet formed at the center;
    a valve case provided over the valve sheet and having a plurality of coolant discharging ports along the circumferential surface;
    a spool valve selectively opening/closing the coolant inlet and the coolant discharging ports in the valve case; and
    a resilient member provided between the valve case and the spool valve, wherein the plurality of coolant discharging ports are spaced from each other by a predetermined distance and one of the plurality of coolant discharging ports is closed so that the spool valve is brought in tight contact with an inner wall surface of the valve case when the coolant discharging ports are initially opened not to be swayed left and right, wherein the valve case includes a first vent hole formed at the center of the top surface and a plurality of second vent holes formed around the first vent hole.

2. The one-way valve of a variable capacity compressor for a vehicle of claim 1, wherein each of the plurality of coolant discharging ports is shaped as a triangle, a trapezoid, or a quadrangle whose top side is shorter than the bottom side.

3. The one-way valve of a variable capacity compressor for a vehicle of claim 1, wherein the spool valve further includes a strip portion that is formed along a lower circumferential surface and inclined at a predetermined angle.

4. The one-way valve of a variable capacity compressor for a vehicle of claim 3, wherein the strip portion of the spool valve is formed to be adjacent to the lower end of the coolant discharging ports when the spool valve is at its initial position.

5. The one-way valve of a variable capacity compressor for a vehicle of claim 1, wherein the diameter of each second vent hole is relatively larger than that of the first vent hole.

6. The one-way valve of a variable capacity compressor for a vehicle of claim 3, wherein the diameter of each second vent hole is relatively larger than that of the first vent hole.

7. The one-way valve of a variable capacity compressor for a vehicle of claim 1, wherein the resilient member has a spring constant of about 26 gf/mm to about 40 gf/mm.

8. The one-way valve of a variable capacity compressor for a vehicle of claim 3, wherein the resilient member has a spring constant of about 26 gf/mm to about 40 gf/mm.

* * * * *